Figure 1:
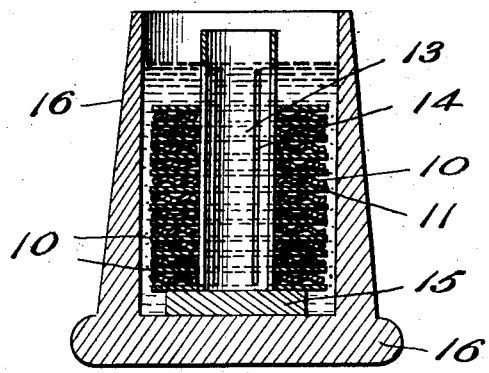

Dec. 9, 1924.

B. B. GOLDSMITH

SOLUBLE INK AND DISPENSING MEANS THEREFOR

Original Filed June 28, 1915

1,518,504

Byron B. Goldsmith
Inventor

Patented Dec. 9, 1924.

1,518,504

UNITED STATES PATENT OFFICE.

BYRON B. GOLDSMITH, OF NEW YORK, N. Y.

SOLUBLE INK AND DISPENSING MEANS THEREFOR.

Continuation of application Serial No. 36,889, filed June 28, 1915. This application filed July 6, 1922. Serial No. 573,164.

*To all whom it may concern:*

Be it known that I, BYRON B. GOLDSMITH, a citizen of the United States, residing in the city, county, and State of New York, have invented certain new and useful Improvements in Soluble Inks and Dispensing Means Therefor, of which the following is a specification.

The inconveniences of transporting ink in liquid form are well known. The accidental opening or breakage of a single bottle can easily ruin the contents of a trunk and, where ink is shipped commercially in considerable quantities the possibility of accidents of this kind is accompanied by other disadvantages. Among these may be named the disproportionate weight of the bottles and the freezing of the ink in cold weather.

These and other reasons have long made it desirable to supply ink in a solid form, suitable for convenient transportation; being light and easily packed, incapable of freezing, and adapted to be dissolved in water when needed for writing purposes. This problem appears not to have found a satisfactory solution. The reason for this appears to be the necessity for too much manipulation and the expenditure of too much time and care in producing a suitable solution of the non-liquid mass, whether solid or pasty. It has been necessary, in prior proposed systems, to employ a bottle of a definite size for a certain amount of solid ink, and it has taken time to produce solution and adequate diffusion. The ink first used has been too weak, and has grown stronger with time, producing a lack of uniformity in color of the writing. Prior systems have often necessitated shaking, with danger of scattering ink with disastrous results.

My present invention relates to an improved means for supplying soluble ink in usable form whereby the various disadvantages above outlined are avoided, and whereby the objections to ordinary liquid ink are obviated. For this purpose I have devised an ink-stand or inkwell composed in part of an outer vessel and a body or bodies of soluble ink disposed around a dipping space in such a manner that any water which is poured into the outer vessel finds its level by percolation between masses of soluble ink or ink-bearing material on its way to the dipping space.

By this means the dipping space is constantly provided with new liquid, affording a substantially uniform ink which is never either too weak or too strong. The soluble ink may have any suitable composition without departing from my invention.

I claim as new, both the inkstand as assembled for use with ink bearing bodies; and, as an article of manufacture and commerce, the soluble ink bearing bodies adapted to be assembled to complete the inkstand. These masses are either homogeneous in structure or formed of a suitable backing having a layer or layers of soluble ink.

This application is a continuation of my prior application first filed June 28th, 1915 and renewed January 4th, 1921, Serial No. 527,059.

Figure 2:
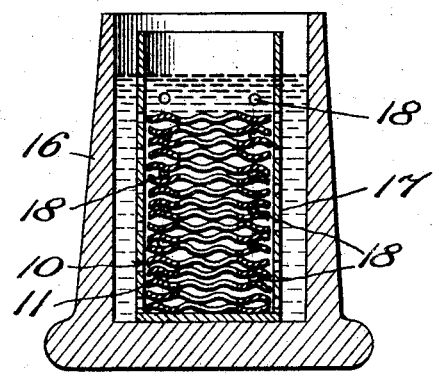
Figure 3:
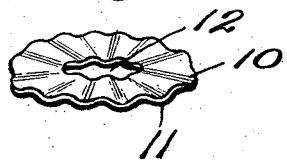
Figure 4:
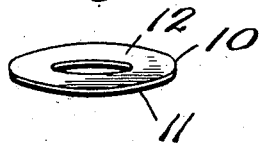
Figure 5:
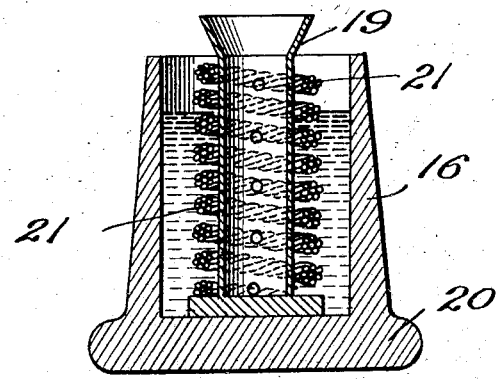

My invention is illustrated in a few of many possible modifications in the accompanying drawings wherein Figures 1 and 2 are vertical sections of two modified forms of inks and made in accordance with my invention, Figures 3 and 4 are perspective views of two forms of wafers, and Figure 5 is a view in vertical section of a modified form.

Figures 1 to 4 relate to a form of my invention wherein the soluble ink is used in the shape of perforated wafers or discs adapted to be assembled in a pile so as to form a dipping space at the center and to afford passages between them through which water may percolate into such central dipping space.

While these discs may be made of homogeneous soluble ink masses without departing from my invention, I prefer in most cases to make them, as shown in Figures 3 and 4, of an insoluble backing 10 faced with a layer of soluble ink 11. Where a number of these discs such as shown in Figure 3 are piled one on another, their central apertures 12 form a dipping space, and the corrugations afford passages through which the water may percolate into said space.

On the other hand simple flat discs, such as shown in Figure 4 may be used, when means are employed for spacing them apart sufficiently to let water percolate between them. This may be accomplished by alternating a flat disc with a corrugated disc, as shown, for instance, in Figure 1.

In this figure the dipping space is surrounded by a cylindrical upright wall 13 of hard rubber or the like, having suitable slots or apertures 14, and forming a central supporting core around and upon which the discs are threaded, so to speak. This core stands on a suitable base 15 resting upon the bottom of the vessel 16.

In the form shown in Figure 2 the dipping space is immediately surrounded by the ink masses, being merely the aggregate space afforded by the apertures 12 in the discs. These are confined in an inner casing 17 of suitable material, as hard rubber, having perforations 18 to admit water.

In Figure 5, the dipping space is found within a hollow perforated core 19 on a base 20, around which core is wound in an extended spiral, a mass 21 containing or consisting of soluble ink. This may be a permeable fabric, such as rope, impregnated with soluble ink.

Indeed the ink discs or their equivalents may be composed wholly or partly of any ink-producing material without departing from my invention.

In the three forms shown in Figures 1, 2 and 5, the water is poured into the vessel 16 outside of the dipping space, and finds its way to said space past the soluble ink surfaces surrounding the same. This water thereby becomes impregnated with ink and produces a substantially uniform writing fluid.

Various changes may be made in these devices without departing from my invention, and I do not limit myself to the details herein shown and described.

What I claim is:—

1. As an article of manufacture a disc containing soluble ink having an aperture of a size suitable for forming a dipping space and having corrugations extending outward from said aperture toward the periphery, whereby when a number of such discs are superposed, passages are afforded for access toward the apertures.

2. As an article of manufacture a disc of non-soluble material provided with an aperture of a size suitable for forming a dipping space and having a layer of soluble ink thereon, said disc having corrugations extending outward from said aperture, whereby when a number of such discs are superposed, passages are afforded for access toward the apertures.

3. In an inkstand, a pile of superposed discs of soluble ink provided with central apertures affording a dipping chamber and having percolating spaces between them, and an outer vessel containing said discs.

4. In an inkstand, a pile of superposed corrugated ink discs provided with central apertures affording a dipping chamber, and an outer vessel containing said discs.

5. In an inkstand, a pile of superposed alternately corrugated and flat discs of soluble ink provided with central apertures affording a dipping space, and an outer vessel containing said discs.

6. In an inkstand, an outer vessel, an inner hollow upright perforated core and superposed ink discs strung on said core.

7. In an inkstand, an outer vessel, an inner hollow upright perforated core and superposed corrugated ink discs strung on said core.

8. In an inkstand, an outer vessel, an inner hollow upright perforated core and alternately corrugated and flat ink discs superposed and strung on said core.

9. In an inkstand, an outer vessel and a pile of superposed ink bearing bodies perforated to produce a dipping space and having laterally extending spaces between them whereby access to the dipping space from the sides is facilitated.

10. In an inkstand, an outer vessel in combination with an ink-producing structure therein, said structure comprising ink-producing masses disposed around a central passage and over each other with intervening spaces, and being associated with an internal dipping chamber.

11. In an inkstand an outer vessel having an internal upwardly extending support surrounding a dipping chamber, in combination with an ink-producing structure supported by said support, said structure comprising ink-producing masses disposed over each other with intervening spaces and arranged to provide a central passage.

In testimony whereof I have hereto set my hand on this 12 day of June 1922.

BYRON B. GOLDSMITH.